W. C. BUCKNAM.
GAS CUTTING MACHINE.
APPLICATION FILED DEC. 31, 1918.

1,324,006.

Patented Dec. 2, 1919.
2 SHEETS—SHEET 1.

INVENTOR
Worthy C. Bucknam
BY
ATTORNEY

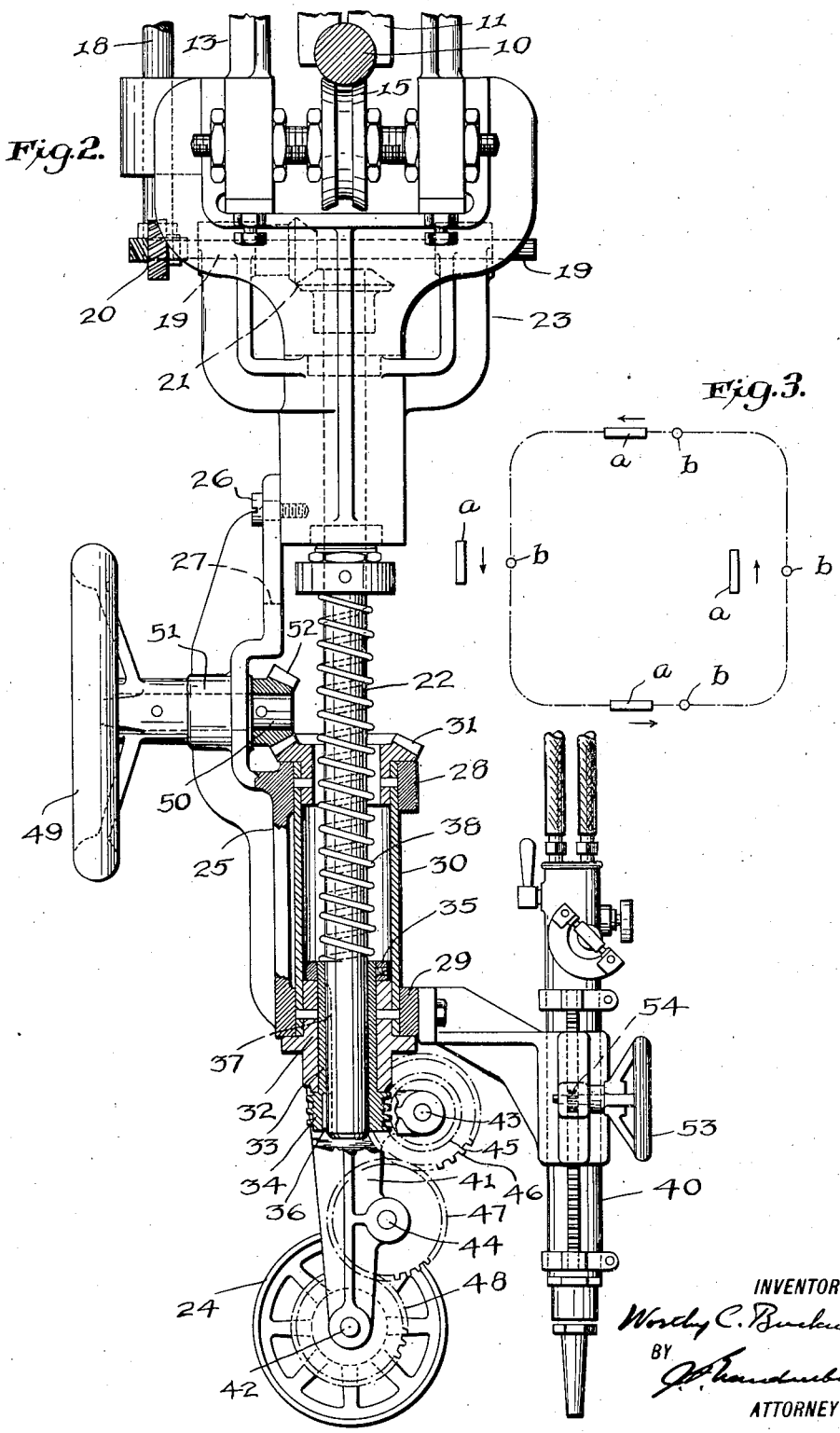

UNITED STATES PATENT OFFICE.

WORTHY C. BUCKNAM, OF JERSEY CITY, NEW JERSEY, ASSIGNOR TO DAVIS-BOURNON-VILLE COMPANY, OF NEW YORK, N. Y., A CORPORATION OF NEW YORK.

GAS CUTTING-MACHINE.

1,324,006.     Specification of Letters Patent.     Patented Dec. 2, 1919.

Application filed December 31, 1918. Serial No. 269,090.

*To all whom it may concern:*

Be it known that I, WORTHY C. BUCKNAM, a citizen of the United States, and resident of Jersey City, in the county of Hudson and State of New Jersey, have invented a new and useful Gas Cutting-Machine, of which the following is a specification.

The invention relates to apparatus for guided cutting in any and changing directions by means of gases, with mechanical propulsion and support for the torch, and comprises an improvement upon and within my prior Patents 1,059,271 and 1,059,329 of April 15, 1913. The specific mechanism constituting the preferred embodiment of the present invention is partly like that disclosed in my prior copending application Serial No. 237,413, filed May 31, 1918, for a flange-trimming machine. The general object is to provide a strong, convenient and effective machine capable of wide range of torch movement for cutting openings in plates or sheets, or for transporting the jets at uniform speed along any path, straight, irregular, or curved.

In the accompanying drawings forming a part hereof:

Fig. 2 is an enlarged end elevation with the end of the arm in section, upper parts broken away, and parts below in vertical section; and Fig. 3 is a diagram.

Figure 1:
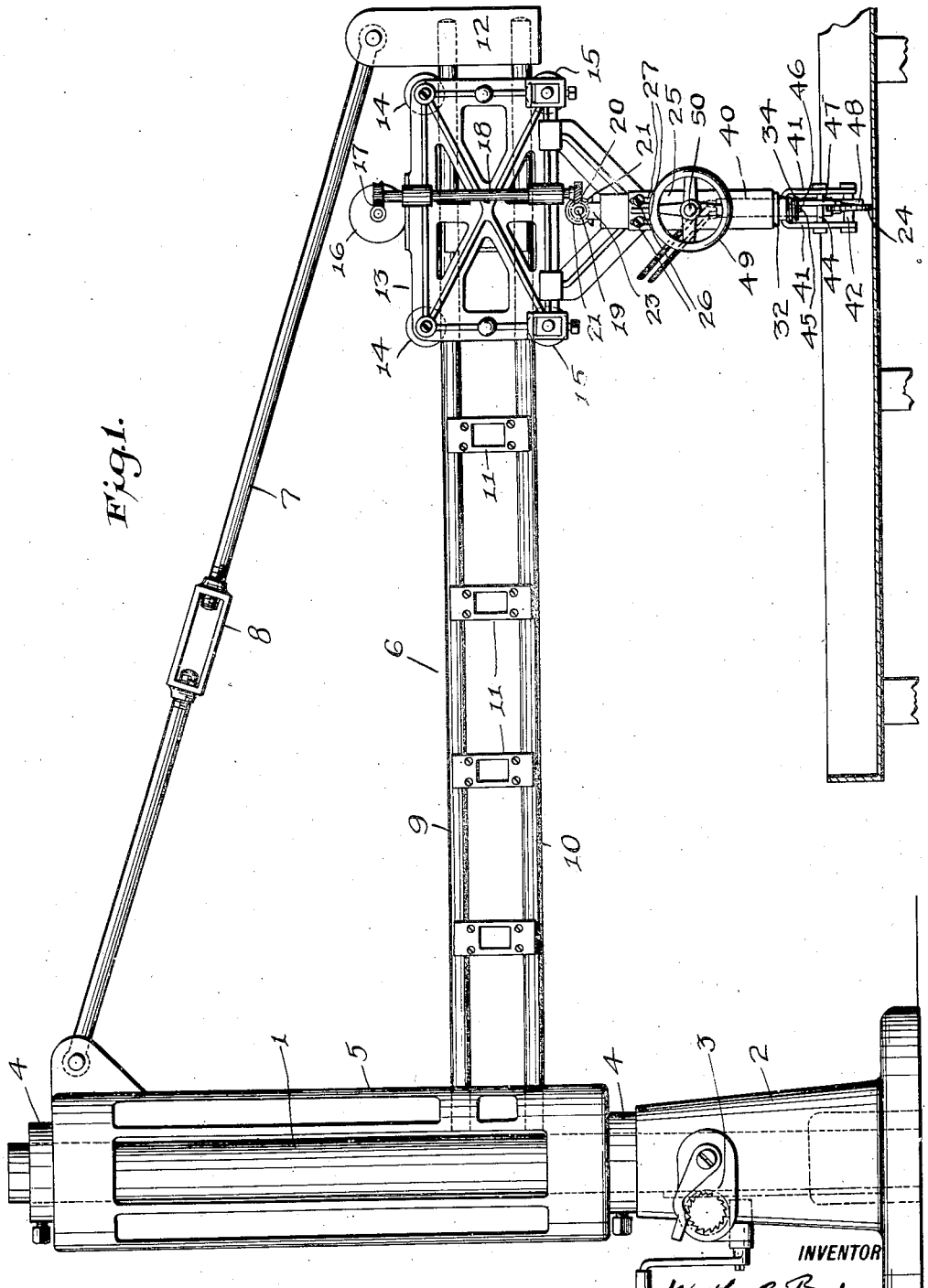
Figure 1 is a side elevation of the machine shown in operative relation to a boiler head or the like, which is represented in section.

The machine includes a standard 1 having a pedestal base 2, in which the standard proper may be raised and lowered by means indicated at 3. The standard carries between collars 4 a rotatable hub frame 5, from which projects a radial arm 6 braced by a diagonal stay rod 7 with turn-buckle 8. The arm is shown composed of a pair of track rods 9 and 10, disposed one above the other, and connected by struts 11 and by an end piece 12, to which the stay rod is fastened.

A carriage 13 having upper and lower grooved wheels 14 and 15 running on the rods 9 and 10 is freely movable in and out on the radial guideway afforded by the laterally swinging arm. Thus, parts carried by the carriage are universally movable in horizontal directions, while being mechanically supported from a main pivotal support. The construction is the same as disclosed in my application Serial No. 237,413 aforesaid, and is preferably employed because of its rigidity and lateral compactness and the accuracy of cutting in large work which can be secured with a universally movable supporting means of this character. Other forms may, however, be used, such as those disclosed in my Patents 1,059,271 and 1,059,329, above referred to, or in my Patent 1,172,933 of February 22, 1916.

As in my application Serial No. 237,413, the carriage 13 bears an electric motor 16, which through worm-gearing 17 drives a vertical shaft 18 journaled in bearings upon one side of the carriage. From the lower end of this shaft is driven a short horizontal lay shaft 19, in this instance through spiral gears 20, and this in turn, through bevel gears 21, drives a vertical, downwardly extending shaft 22 journaled and held against vertical movement in a downwardly projecting yoke frame 23 on the carriage. The entire driving means is carried by the carriage, which is freely movable in and out on the arm in response to the movement of the vertical feed wheel 24, about to be described, upon the work. The gearing employed between the motor and feed wheel effects a very substantial speed reduction, enabling an appropriate uniform rate of cutting to be maintained, which rate can be varied in accordance with the nature of the work by regulation of the motor in any of the customary ways.

A bracket 25 is secured at its upper end by screws 26 to a side face of the frame 23, the shanks of the screws passing through vertical slots 27 in the bracket and the connection being such that the bracket is free to move vertically to a limited extent relatively to the carriage. The lower part of said bracket has two internal bearing rings 28, 29, in which a tube 30, forming part of a vertical swivel, is free to turn. An annular bevel steering gear 31 is pinned to the upper end of the tube, and a flanged body 32 is similarly united to its lower end; and the two by extending across the ends of the bearings hold the swivel against vertical displacement in the bracket. The hollow body 32 forms a bearing for a rotary sleeve 33 carrying a worm 34 upon its lower end, the worm being held against vertical displacement by the shoulder at the lower end of the sleeve and a collar 35 fastened to the upper end thereof. The shaft 22 passes through the tubular part of the swivel and through the sleeve 33, wherein the shaft has a slidable bearing. Driving connection between the shaft and worm-gear sleeve is established by a key 36 and key-way 37, which permit the parts carried by the bracket 25 to rise and fall relatively to the shaft, a vertical sliding joint thus being provided in the driving train for the feed wheel as well as in the depending supporting structure. An expansion spring 38 coiled about the shaft between a collar 39, above, and the sleeve 33, below, urges the wheel downward upon the work, insuring traction, while permitting the wheel and with it the torch 40, presently to be described, to accommodate themselves to inequalities in the surface of the work.

The body 32 has two downwardly extended side-pieces 41, the lower ends of which hold the horizontal axle 42 of the vertical feed wheel. Other transverse shafts or axles 43, 44 in the lower part of the swivel carry, respectively, a worm wheel 45 meshing with the worm 34 and compounded with a spur gear 46, and an idler gear 47, meshing on the one hand with the gear 46 and on the other hand with a gear 48 united to turn with the feed wheel. The vertical axis of the drive shaft 22 and of the swivel intersects the axis of revolution of the feed wheel and falls within its point of rolling contact on the work. Consequently the wheel can be turned for steering without thereby displacing the parts to which it is connected relatively to the work, and the driving mechanism is such, through the employment of the worm gearing 34, 45, of which the worm is coaxial with the swivel, that there is practically no appreciable deviation in the steering due to the reaction of the drive. Similar features are disclosed in my Patents 1,059,271 and 1,059,329.

Steering is here effected by a vertical hand wheel 49 standing out from the bracket 25, upon a horizontal steering shaft 50 journaled in a bearing 51 in the intermediate portion of said bracket, and carrying a bevel gear 52 on its inner end meshing with the bevel gear 31.

The torch 40 is held in a downwardly directed position in the sleeve 41 of a short laterally projecting torch-support bracket 42, which is bolted to the bearing ring portion 29 of the vertically yieldable bracket 25. The torch is thus supported in fixed proximity to the swivel axis of the feed wheel, with which it travels about over the work, but the torch is not turned when the wheel is swiveled for steering. The diagram of Fig. 3 illustrates the relations of the torch and feed wheel in cutting a four-sided opening, $a$ being the wheel and $b$ the torch tip. As at one time the wheel follows directly behind the torch, over the cut, the rim of the wheel must consequently be slightly wider than the slot which will be formed by the oxygen jet. With this apparatus cutting may be performed in any direction, and over a considerable range, and all steering is effected adjacent the region of cutting.

The torch, it will be understood is a customary cutting torch, constituting a means for delivering heating and cutting jets against the work. The torch may be vertically adjusted in its holder by a hand-wheel 53 operating a rack and pinion 54.

In practice the present machine and that of application Serial No. 237,413 can be combined that is to say, with the same standard, arm, and carriage, and by substituting parts carried by the carriage the machine can be changed over from a flange-trimming apparatus to one adapted to travel upon an underlying surface for making cuts therein.

What I claim as new is:

1. A machine for effecting universal cutting by means of gases, comprising, in combination, a standard, a projecting arm pivoted to swing laterally on the standard, a vertical feed-wheel adapted to roll upon the surface of the work, a support for a downwardly-directed torch adjacent the feed-wheel, a steering-swivel for the feed-wheel enabling the same to be turned about a vertical axis relatively to the torch-support, which latter does not partake of such swiveling movement, driving means geared to the feed-wheel accommodated to the swiveling movement, means whereby the swivel and torch-support are carried in fixed proximity to each other by the arm with freedom to move toward and from the standard as well as laterally in response to the movements of the feed-wheel, so that the torch and wheel can travel together in any direction over the work.

2. A machine for effecting universal cutting by means of gases, comprising, in combination, a standard, a radial arm mounted to swing laterally on the standard, a carriage movable freely in and out on the arm, a vertical feed-wheel adapted to roll upon the surface of the work, a support for a downwardly-directed torch adjacent the feed-wheel, a steering swivel for the feed-wheel enabling the same to be turned about a vertical axis relatively to the torch-support, which latter does not partake of such swiveling movement, said swivel and torch-support being carried in fixed proximity by the carriage, and driving means geared to the feed-wheel and accommodated to the swiveling movement thereof, whereby the torch and feed-wheel can travel together in any direction over the work.

3. A machine for effecting universal cutting by means of gases, comprising, in combination, a standard, a radial arm mounted to swing laterally on the standard, a carriage movable freely in and out on the arm, a vertical feed-wheel adapted to roll upon the surface of the work, a support for a downwardly-directed torch adjacent the feed-wheel, a steering swivel for the feed-wheel enabling the same to be turned about a vertical axis relatively to the torch-support, which latter does not partake of such swiveling movement, said swivel and torch-support being carried in fixed proximity by the carriage, a motor on said carriage, and driving connections between the same and the feed-wheel accommodated to the swiveling movement of the wheel, whereby the torch and feed-wheel can travel together in any direction over the work.

4. A machine for effecting universal cutting by means of gases, comprising, in combination, a standard, a projecting arm pivoted to swing laterally on the standard, a depending structure carried by the arm in such manner that it can move freely in and out relatively to the standard as well as laterally, a vertical swivel in said depending structure, a feed-wheel carried by said swivel so as to be capable of turning upon its point of rolling contact on the work, driving means geared to the feed-wheel accommodated to such swiveling movement, and a torch-support on said depending structure adjacent the feed-wheel and independent of the swiveling thereof.

5. A machine for effecting universal cutting by means of gases, comprising, in combination, a standard, a projecting arm pivoted to swing laterally on the standard, a bracket carried by the arm in such manner that it can move freely in and out relatively to the standard as well as laterally, a slidable connection and spring whereby said bracket is yieldable vertically relatively to the arm, a vertical swivel on said vertically yieldable bracket, a vertical feed-wheel on said swivel, driving means connected with the feed-wheel, and a torch-support fixed to the bracket.

6. A machine for effecting universal cutting by means of gases, comprising, in combination, a standard, a projecting arm pivoted to swing laterally on the standard, a bracket carried by the arm in such manner that it can move freely in and out relatively to the standard as well as laterally, said bracket in addition having a vertically movable connection with the arm, a vertical swivel on said vertically yieldable bracket, a vertical feed-wheel on said swivel, driving means including a shaft extending through the swivel and connected with the feed-wheel, a spring encircling said shaft to hold the feed-wheel yieldingly against the work, and a torch-support fixed to the bracket.

7. A machine for effecting universal cutting by means of gases, comprising, in combination, a standard, a projecting arm pivoted to swing laterally on the standard, a carriage carried by the arm in such manner as to be movable freely in and out relatively to the standard as well as laterally, driving means on the carriage having a shaft extending vertically downward, a downwardly-extending bracket secured by a vertically slidable connection to the carriage, a vertical swivel mounted on said bracket, a torch-support fixed to the bracket, a vertical feed-wheel carried by the swivel, gearing between said shaft and the feed-wheel, and a spring urging the bracket and parts carried thereby downward, the driving connections for the feed-wheel including a vertically slidable joint.

8. A machine for effecting universal cutting by means of gases, comprising, in combination, a standard, a projecting arm pivoted to swing laterally on the standard, a carriage carried by the arm in such manner as to be movable freely in and out relatively to the standard as well as laterally, driving means on the carriage having a shaft extending vertically downward, a downwardly-extending bracket secured to the carriage, a vertical swivel in said bracket through which said shaft passes, a torch-support fixed to the bracket, a vertical feed-wheel carried by the swivel, and gearing on the swivel between the shaft and feed-wheel.

9. In a machine of the character described, the combination of a standard, a projecting arm pivoted on the standard, a bracket carried by the arm in such manner that it can move freely in all horizontal directions, a vertical swivel on said bracket, a vertical feed-wheel on said swivel, driving means geared to the feed-wheel and accommodated to the swiveling movement thereof, a steering wheel on the bracket and steering gears connecting the same with the swivel.

10. In a machine of the character described, the combination of a standard, a projecting arm pivoted on the standard, a downwardly-projecting bracket carried by the arm in such manner that it can move freely in all horizontal directions, said bracket having a vertical internal bearing, a vertical hollow swivel in said bearing, a vertical feed-wheel mounted in the swivel, a vertical drive shaft passing through the swivel and geared to the feed-wheel, a steering gear on the swivel, and a horizontal steering shaft with hand-wheel and meshing gear on the bracket.

WORTHY C. BUCKNAM.